(No Model.) 2 Sheets—Sheet 2.

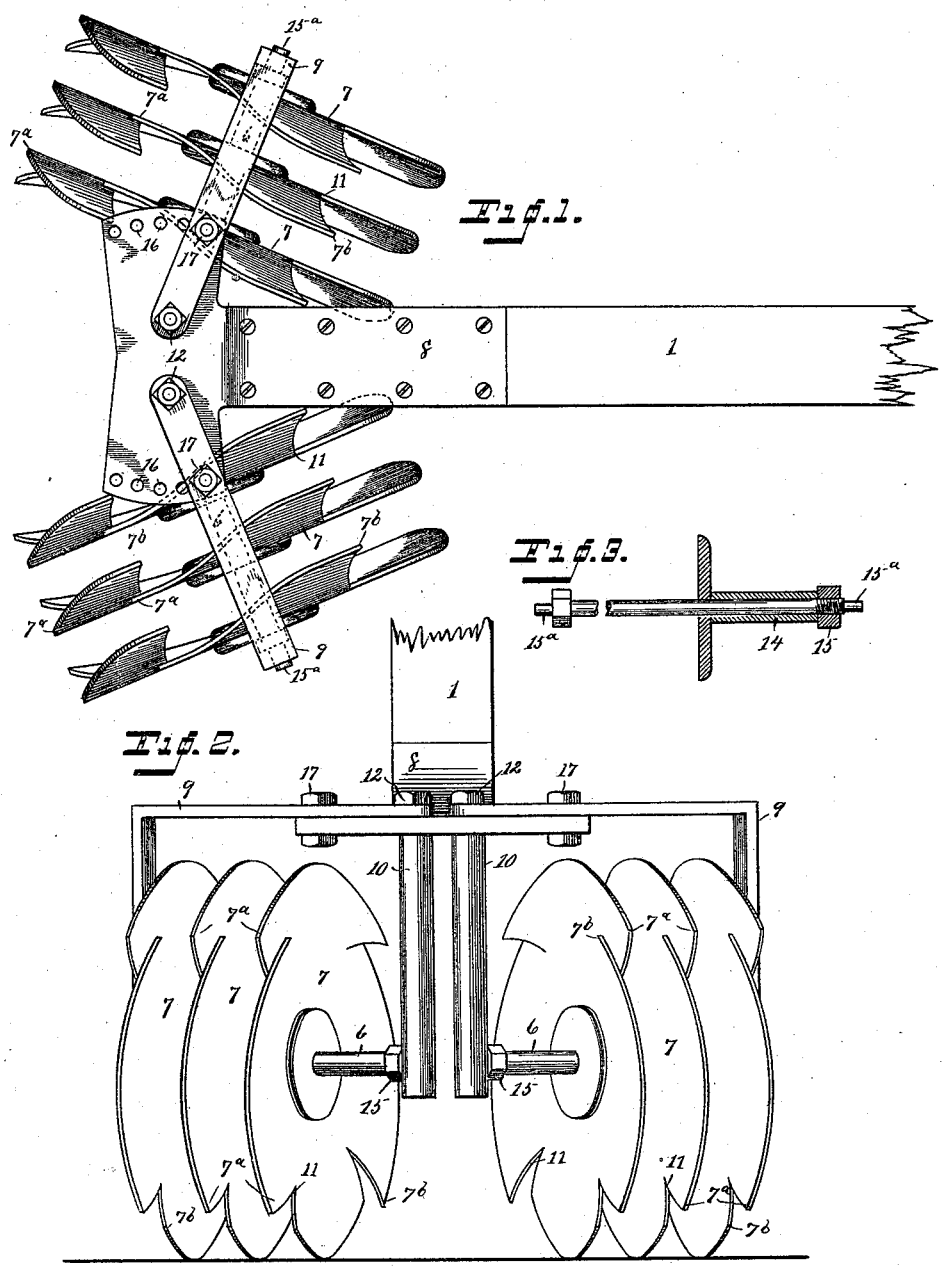

T. E. DAVIES.
CULTIVATOR AND HARROW.

No. 417,547. Patented Dec. 17, 1889.

Witnesses
C. M. Newman,
Ella J. Pettit.

Inventor
Thomas E. Davies
By J. M. Wooster
Atty.

UNITED STATES PATENT OFFICE.

THOMAS E. DAVIES, OF SEYMOUR, CONNECTICUT.

CULTIVATOR AND HARROW.

SPECIFICATION forming part of Letters Patent No. 417,547, dated December 17, 1889.

Application filed May 18, 1889. Serial No. 311,258. (No model.)

*To all whom it may concern:*

Be it known that I, THOMAS E. DAVIES, a citizen of the United States, residing at Seymour, in the county of New Haven and State of Connecticut, have invented certain new and useful Improvements in Cultivators and Harrows; and I do hereby declare the following to be a full, clear, and exact description of the invention, such as will enable others skilled in the art to which it appertains to make and use the same.

My invention relates to the general class of agricultural implements—such as cultivators, harrows, &c.—in which the action of stirring the soil, cutting weeds, &c., is performed by disks carried by a shaft, and has for its object to so improve the construction and action of the disks as to lessen the draft of the implement and at the same time to greatly improve its operation in use; and my invention consists, secondly, in a special construction and arrangement of the parts by which the implement is adapted for use as a garden-cultivator.

With these ends in view I have devised the novel disk and organization of parts coacting therewith, of which the following description, in connection with the accompanying drawings, is a specification, numbers being used to denote the several parts.

Figure 10:
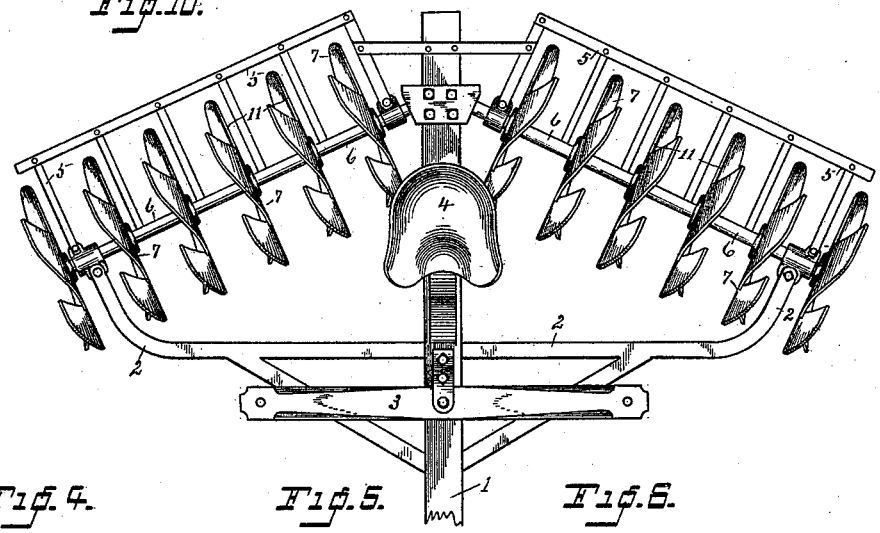
Figure 4:
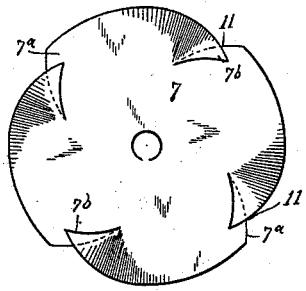
Figure 5:
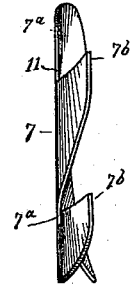
Figure 6:
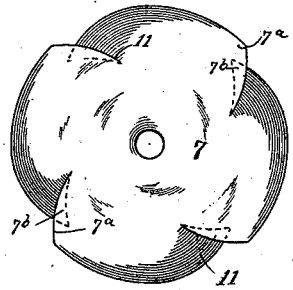
Figure 7:
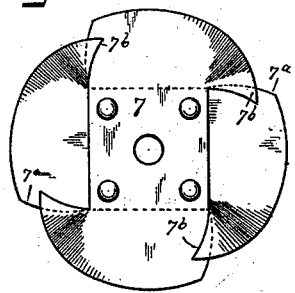
Figure 8:
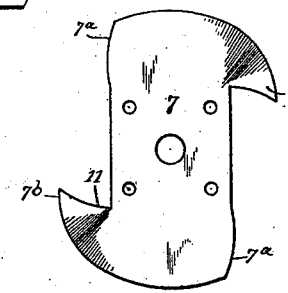
Figure 9:
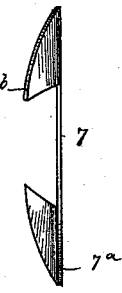

Figure 1 is a plan view of my novel garden-cultivator complete; Fig. 2, a rear elevation thereof; Fig. 3, a detail view showing a collar, sleeve, and nut in section, the end of the shaft being in elevation. Figs. 4, 5, and 6 are respectively a face view, an edge view, and a back view of one of my novel disks detached; Fig. 7, a face view of a disk made from two pieces of metal riveted together. Figs. 8 and 9 are respectively a face view and edge view of one of the pieces from which said disk is formed, and Fig. 10 is a plan view showing the application of my novel disks to an ordinary field-harrow.

1 denotes the tongue or handle-bar, and 8 a plate rigidly secured thereto.

6 denotes the shafts, which are mounted in suitable adjustable supports. It will of course be apparent that the special construction of these supports is not of the essence of my invention, it being simply required that said supports be made readily adjustable, so that the angle of the shafts relatively to the handle-bar may be changed to adapt the implement to various classes of work. In the present instance I have shown the supports as made in the simplest manner possible, each support consisting of an angle-piece 9 and a vertical rod 10, mounted in plate 8 and adapted to turn freely therein, the horizontal arm of the angle-piece being secured to the top of the vertical rod by a nut 12.

7 denotes the disks, which in practice are made of suitable size for the special implement upon which they are to be used. In practice I make them eight inches (more or less) in diameter for garden-cultivators, and sixteen inches (more or less) in diameter for field-harrows. The outer portion of these disks, extending inward from one to four inches, or thereabout, is divided into sections by curved cuts 11, the inward direction of said cuts lying outside of a radial line. The sections in making are shaped as follows: The front line of each section is left in the general plane of the disk—that is, a vertical plane when in operative position. Starting from that point, however, each section is curved laterally in a similar manner to the mold-board of a plow, so that the rear line of a section will stand considerably outward from the front line thereof. In practice the rear end of each section in an ordinary garden-cultivator will stand from one to two inches outward from the general plane of the disk, and in a field-harrow from two to four inches outward from the general plane of the disk, it being understood, of course, that the sections of the disks upon the right side of the harrow or cultivator are curved toward the right, and those upon the left side are curved toward the left. Perfectly satisfactory results will be secured in a sixteen-inch disk by making the cuts four inches (more or less) in length, and causing the rear ends of the sections to stand outward three inches (more or less) from the general plane of the disk. The general curvature of the sections will be understood from Fig. 4, in which I have designated the forward ends of the sections as 7ª and the rear ends as 7ᵇ. Instead of making the disks in a single piece, as in Figs. 4, 5, and 6, the disks may be made in two pieces and riveted together, as shown in Figs. 7, 8, and 9, this being a matter wholly within the judgment of the manufacturer. In practice the edges of the sections are sharpened in the usual manner.

The action of my novel disk is wholly different from any other disk in use. The laterally-curved cutting-edges render it unnecessary in practice to place the disks at so great an angle with the line of draft as has heretofore been necessary, thereby lessening the power required. In practice the edges of the sections act with a shearing instead of with the usual scraping movement. This also reduces the strain and friction, and consequently produces a material saving of power. As the disks travel over the ground the effect of the laterally-curved cutting-edges of the sections is to form a series of curved cuts or grooves, each bearing toward the right or left according to its position in the implement, each cut beginning two inches (more or less) outward from the point where the preceding cut or groove terminated. Each section is, in fact, a diminutive plowshare, and turns a small furrow equal in width to the sweep of its own curve and equal in length to the length of its own cutting-edge. The linear course of each disk may be described as a series of outwardly-curved furrows, each beginning at a point in a line parallel to the line of draft and terminating at a point two inches (more or less) outside of the line of the starting-point. In manufacturing, these disks are formed in any suitable manner, ordinarily, of course, by presses.

In my garden-cultivator, which is clearly illustrated in Figs. 1 and 2, the shafts pass through the series of disks on each side, each disk being strengthened on opposite sides by a collar 13, and the disks being held in proper position on the shafts by sleeves 14. Each shaft is provided at its outer end with a threaded portion which is engaged by a nut 15, whereby the sleeves, collars, and disks are locked in proper position on the shaft, all of said parts turning with the shaft in use. The ends of the shafts are preferably reduced, as at 15ª, (see Fig. 3,) and engage sockets in the vertical arm of angle-piece 9 and vertical rod 10. When the implement is used as a cultivator, the operator stands behind it and pushes it ahead in the usual manner. The disks act to cut the weeds and to stir the top of the soil thoroughly.

In order to provide a ready adjustment for the shafts, to adapt the implement for use in cultivating rows of vegetables at different distances apart, I provide radial series of holes 16 at the ends of plate 8, and make a hole in each of the horizontal arms of the angle-piece, which is adapted to register with any of the holes in the series. Bolts 17 are passed through the holes in the angle-pieces and through one of the holes in each series to lock the arms at any desired adjustment, as is clearly shown in Fig. 1. As already stated, the upper end of each vertical rod passes through the horizontal arm of one of the angle-pieces. It will be seen, therefore, that when bolts 17 are removed the supports, carrying with them the shafts and disks, may be readily adjusted in the arc of a circle.

An important feature of my invention, especially as applied to cultivators, is the reversibility of the disks. As shown in the drawings, the disks are mounted on the shafts in the manner required for the first process of cultivation, in which the surface soil is moved from the sides toward the center. At the succeeding operations of cultivation the surface soil requires to be moved from the center toward the rows of growing plants. This result is accomplished by simply reversing the disks—that is, shifting the right gang of disks to the left side of the implement, and vice versa. This operation may be performed by any person, and requires less than five minutes' time.

In Fig. 10 I have illustrated my novel disk as applied to a field-cultivator which is adapted to be drawn by a team of horses in the usual manner. In this form, 2 denotes the usual cross-piece; 3, the evener; 4, a seat for the driver, and 5 clod-breakers of ordinary construction.

Having thus described my invention, I claim—

1. A disk for cultivators, harrows, &c., the periphery of which is divided into sections by inwardly-extending curved cuts, the forward line of each section lying in the general plane of the disk, from which point the edges of the sections curve outward on the same side of the disk and terminate at a distance from the general plane thereof, whereby each section in use is caused to act like the moldboard of a plow and turn a small outwardly-curved furrow, substantially as described.

2. In a cultivator, the combination, with plate 8, adjustable supports adapted to swing thereon, and shafts journaled in said supports, of a series of reversible disks upon said shafts, collars 13 and sleeves 14, which hold the disks in position, and nuts 15, engaging the shafts and bearing against the sleeves, as and for the purpose set forth.

3. In a cultivator, a plate 8, having radial series of holes and vertical rod 10, whose upper end passes through said plate, and an angle-piece the end of whose horizontal arm engages the end of the vertical rod, in combination with a shaft 6, carrying disks and journaled in the angle-piece and the vertical rod, and a bolt passing through the angle-piece and any hole of the series, whereby the angle of the shafts and disks relatively to the line of draft may be adjusted and the implement adapted to rows at different distances apart.

4. In a cultivator, plate 8, having radial series of holes, shafts 6, and disks 7 thereon, in combination with supports for said shafts, each support consisting of a vertical rod passing through the plate, and an angle-piece the horizontal arm of which is secured to the vertical rod, substantially as described.

In testimony whereof I affix my signature in presence of two witnesses.

THOMAS E. DAVIES.

Witnesses:
 CHARLES L. LOCKWOOD,
 GEORGE WYANT.